United States Patent

Seni et al.

[11] Patent Number: 5,690,321
[45] Date of Patent: Nov. 25, 1997

[54] VIBRATION DAMPING SYSTEM FOR VEHICLE

[75] Inventors: Hirofumi Seni; Norihiko Nakao; Chiaki Santo; Shin Takehara; Naoki Ikeda; Shingo Harada; Yutaka Tukahara, all of Hiroshima-ken, Japan

[73] Assignee: Mazda Motor Corporation, Hiroshima-ken, Japan

[21] Appl. No.: 673,473

[22] Filed: Jul. 1, 1996

Related U.S. Application Data

[63] Continuation of Ser. No. 407,042, Mar. 17, 1995, abandoned, which is a continuation of Ser. No. 123,221, Sep. 20, 1993, abandoned.

[30] Foreign Application Priority Data

Sep. 29, 1992 [JP] Japan .................................. 4-284071
Aug. 19, 1993 [JP] Japan .................................. 5-204850

[51] Int. Cl.[6] ........................................................... G10L 3/00
[52] U.S. Cl. ........................................ 267/140.14; 381/71
[58] Field of Search ........................................ 188/299, 378, 188/379, 380; 180/312; 381/47, 71, 94; 267/140.14, 140.15

[56] References Cited

U.S. PATENT DOCUMENTS 4,417,098  11/1983  Chaplin et al. .................................. 381/71
5,170,433  12/1992  Elliott et al. .................................... 381/47
5,219,037  6/1993   Smith et al. ................................. 267/140.13

FOREIGN PATENT DOCUMENTS

539939     5/1993  European Pat. Off. ................. 381/71
0178846    8/1991  Japan ................................... 381/71
0203491    9/1991  Japan ................................... 381/71
3-219319   9/1991  Japan .
2201858    9/1988  United Kingdom .
9208255    5/1992  WIPO ................................... 381/71

*Primary Examiner*—Matthew C. Graham
*Attorney, Agent, or Firm*—Sixbey, Friedman, Leedom & Ferguson, P.C.; Gerald J. Ferguson, Jr.; Donald R. Studebaker

[57] ABSTRACT

A vibration damping system for a vehicle includes a vibration sensor which detects vibration of a predetermined vibrating element on the vehicle, a vibrator which vibrates the vibrating element, and a drive control unit which controls the vibrator on the basis of the detecting signal from the vibration sensor so that a predetermined object vibration component of the vibration of the vibrating element is damped by the vibration generated by the vibrator. The drive control unit is restrained from controlling the vibrator according to the condition of a predetermined factor of the vehicle.

20 Claims, 11 Drawing Sheets

VIBRATION DAMPING SYSTEM FOR VEHICLE

This application is a Continuation of Ser. No. 08/407, 042, filed Mar. 17, 1995, now abandoned, which is a Continuation of Ser. No. 08/123,221, filed Sep. 20, 1993, now abandoned.

BACKGROUND OF THE INVENTION

1. Field of the Invention

This invention relates to a vibration damping system for a vehicle, and more particularly to a vibration damping system for a vehicle which damps vibration of a predetermined vibrating element such as a solid element forming the vehicle body or air in the cabin by applying vibration to the vibrating element by a vibrator.

2. Description of the Prior Art

In such a vibration damping system, vibration of a predetermined vibrating element is detected by a vibration sensor and a vibrator is controlled on the basis of the output signal of the vibration sensor to apply to the predetermined vibrating element vibration which cancels a particular vibration component of the vibration of the vibrating element which is to be damped. Such a particular vibration component will be referred to as "the object vibration component", hereinbelow. A vibration component transmitted to the vibrating element from a vibrating body on the vehicle (generally an engine) which often disturbs the passenger on the vehicle is generally selected as the object vibration component.

As the processing method for controlling the vibrator, an optimization method is generally used as disclosed, for instance, in Japanese National-Publication-of-translated-version No. 1(1989)-501344, though there have been known those in which the vibrator is controlled without use of the optimization method. Further as also disclosed in the national publication above, a speaker is generally used as the vibrator when vibration of air in the cabin (noise) is to be damped. However, there have been known those in which a vibrating engine mount which supports the engine relative to the vehicle body and vibrates the engine and the vehicle body is used as the vibrator as disclosed, for instance, in Japanese Unexamined Patent Publication No. 3(1991)-219319.

Generally vibration of the vibrating element includes vibration component other than the object vibration component (will be referred to as "the outside vibration component", hereinbelow), and the level of the outside vibration component can become substantially high, for instance, when the operating condition of the vehicle changes. When the level of the outside vibration component is high, normal damping of the object vibration component cannot result in a satisfactory vibration damping effect and can instead result in increase of vibration. Performance of control in such a situation is in vain and results in useless consumption of electric power for driving the vibrator.

Further it is preferred that the vibration damping control be performed sufficiently taking into account influence on other performances of the vehicle, e.g., driving performance. That is, even if an excellent vibration damping effect can be obtained, it will not be desirable if the driving performance of the vehicle and the like are adversely affected.

SUMMARY OF THE INVENTION

In view of the foregoing observations and description, the primary object of the present invention is to provide a vibration damping system for a vehicle in which performance of useless control which cannot result in a satisfactory vibration damping effect or control which adversely affects the performance of the vehicle can be prevented.

The vibration damping system in accordance with the present invention comprises a vibration sensor which detects vibration of a predetermined vibrating element on the vehicle, a vibrator which vibrates the vibrating element, and a drive control means which controls the vibrator on the basis of the detecting signal from the vibration sensor so that a predetermined object vibration component of the vibration of the vibrating element is damped by the vibration generated by the vibrator and is characterized by having a restraining means which restrains the drive control means from controlling the vibrator according to the condition of a predetermined factor of the vehicle.

The vibrating element may be an engine, a transmission, a body frame, a body panel, a steering wheel or the like.

The predetermined factor is a factor a change of which affects the vibration damping effect or the like.

For example, the restraining means restrains the drive control means when the level of the outside vibration component is higher than a predetermined level.

In one embodiment of the present invention, it is determined that the level of the outside vibration component is higher than the predetermined level when the level of the vibration of air in the cabin while the vibrator is controlling is higher than a predetermined level.

In another embodiment of the present invention, it is determined that the level of the outside vibration component is higher than the predetermined level when the level of the vibration of air outside the cabin while the vibrator is controlling is higher than a predetermined level.

In still another embodiment of the present invention, it is determined that the level of the outside vibration component is higher than the predetermined level when the window of the vehicle is opened wider than a predetermined value while the vibrator is controlling.

In still another embodiment of the present invention, it is determined that the level of the outside vibration component is higher than the predetermined level when it is raining while the vibrator is controlling.

In still another embodiment of the present invention, it is determined that the level of the outside vibration component is higher than the predetermined level when the vehicle is running through a tunnel while the vibrator is controlling.

In still another embodiment of the present invention, it is determined that the level of the outside vibration component is higher than the predetermined level when a predetermined instrument such as an audio system other than the power unit is operating at a level higher than a predetermined level while the vibrator is controlling.

In still another embodiment of the present invention, it is determined that the level of the outside vibration component is higher than the predetermined level when the running condition of the vehicle is unstable while the vibrator is controlling.

In still another embodiment of the present invention, it is determined that the level of the outside vibration component is higher than the predetermined level when the transmission is in a low gear speed while the vibrator is controlling.

In still another embodiment of the present invention, it is determined that the level of the outside vibration component is higher than the predetermined level when the vehicle is running rough road while the vibrator is controlling.

In still another embodiment of the present invention, the restraining means restrains the drive control means when there is no passenger.

In still another embodiment of the present invention, the restraining means restrains the drive control means when the voltage of the battery is lower than a predetermined value.

In still another embodiment of the present invention, said vibrator is a vibrating mount which supports a power unit of the vehicle relative to the vehicle body and said restraining means restrains the drive control means from controlling the vibrating mount when the degree of acceleration or deceleration is larger than a predetermined value.

In still another embodiment of the present invention, said vibrator is a vibrating mount which supports a power unit of the vehicle relative to the vehicle body and said restraining means restrains the drive control means from controlling the vibrating mount when the degree of cornering is larger than a predetermined value.

Thus in accordance with the present invention, when it is not expected that drive of the vibrator can result in a satisfactory vibration damping effect or when it is expected that drive of the vibrator can adversely affect the performance of the vehicle, the drive control means is restrained from controlling the vibrator, whereby useless consumption of electric power is prevented.

Further when drive of the vibration damping system is useless as when there is no passenger, drive of the vibrator is restrained and useless consumption of electric power is prevented. Further, when the voltage of the battery is low, drive of the vibrator is restrained and the battery is prevented from being exhausted.

When the vehicle is quickly accelerating or decelerating or when the vehicle is in an unstable condition such as making a sharp cornering, it is preferred that the power unit be rigidly supported relative to the vehicle body in order to improve throttle response to finely control the position of the vehicle body. By restraining drive of the vibrating engine mount, the mounting portion of the power unit on the vehicle body can be hardened.

When low frequency vibration is transmitted to the vehicle body from the road surface as when the vehicle is in another unstable condition such as running rough road, the phase of the vibration of the power unit can shift relative to that of the vibration of the vehicle body, which can adversely affect the driving performance of the vehicle. In such a case, it is preferred that the mounting portion of the power unit on the vehicle body be hardened by restraining drive of the vibrating engine mount.

DESCRIPTION OF THE PREFERRED EMBODIMENTS

Figure 1:
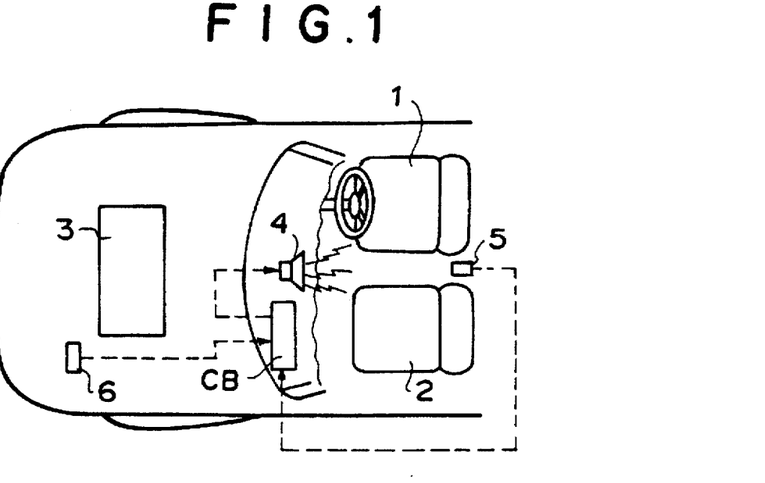
FIG. 1 is a fragmentary schematic view of a vehicle provided with a vibration damping system in accordance the present invention.

In FIG. 1, reference numeral 1 denotes a driver's seat, reference numeral 2 denotes an assistant driver's seat and reference numeral 3 denotes an engine (power unit). In this embodiment, the predetermined vibrating element is air in the cabin, and a control signal for generating vibration for damping vibration of air in the cabin is generated according to an optimization method using an adaptive digital filter which will be described later.

A speaker 4 for generating vibration for damping the vibration of air in the cabin and a microphone 5 which detects the vibration of air in the cabin are disposed substantially on the longitudinal axis of vehicle body. For example, the speaker 4 is disposed on an instrument panel on the front side of the cabin and the microphone 5 is disposed on the ceiling of the cabin. Though the speaker 4 and the microphone 5 are each one in this embodiment for the purpose of simplicity, a plurality of speakers 4 and the microphones 5 may be provided.

Figure 2:
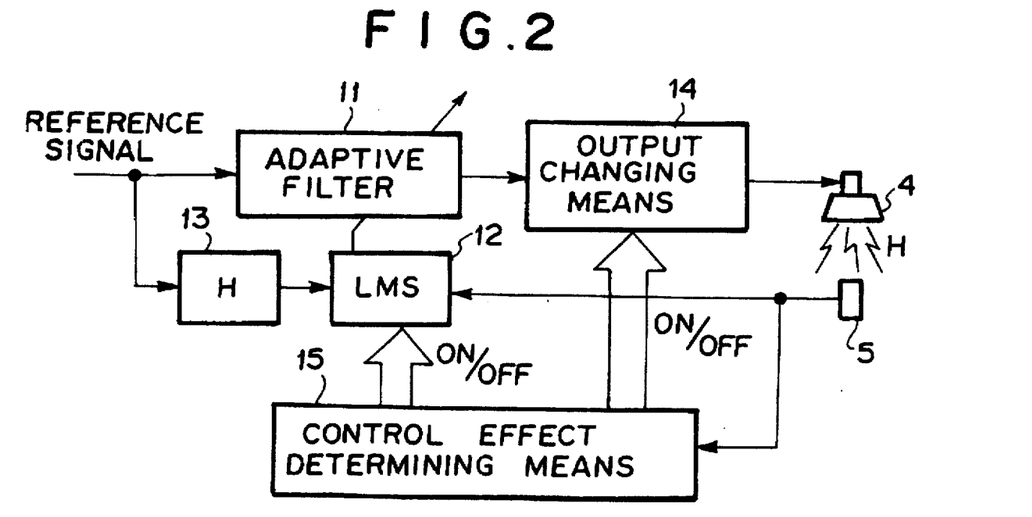
FIG. 2 is a schematic view showing the structure of the control box employed in a first embodiment of the present invention.

In FIG. 1, CB denotes a control box and the structure of the control box CB is schematically shown in FIG. 2. In FIG. 2, reference numeral 11 denotes an adaptive digital filter, reference numeral 12 denotes an adaptive algorithm which sets the convergent factor of the filter 11, and reference numeral 13 denotes a transmission property model (delay circuit). The adaptive digital filter 11, the adaptive algorithm 12 and the transmission property model 13 form a drive control means which adjusts every moment the level and the phase of the output signal to the speaker 4 which govern the level and the phase of the vibration generated by the speaker 4 to damp the vibration of air in the cabin.

As the adaptive algorithm for optimization, any one of various known algorithms such as of Least Mean Square Method can be employed. The method of optimization per se is well known and accordingly will not be described in detail here. In this particular embodiment, the engine 3 is a four-cylinder four-cycle engine, and the vibration component transmitted from the engine 3 to the air in the cabin, more particularly the engine revolution secondary component which is the most troublesome, is taken as the object vibration component. However other engine revolution component such fourth component on sixth component may be selected as the vibration component to be damped. As the reference signal, for instance, a signal from a revolution cycle sensor 6 which detects the ignition pulses can be used.

In FIG. 2, reference numeral 14 denotes an output changing means which permits or inhibits transmission of the control signal from the filter 11 to the speaker 4. Reference numeral 15 denotes a control effect determining means which determines whether generation of vibration by the speaker 4 is effective for damping of the object vibration component transmitted to the air in the cabin from the engine 3. The control effect determining means 15 switches the operational state of the adaptive algorithm 12 and the output changing means 14. Thus in this embodiment, the output changing means 14 and the control effect determining means 15 form the restraining means.

Figure 3:
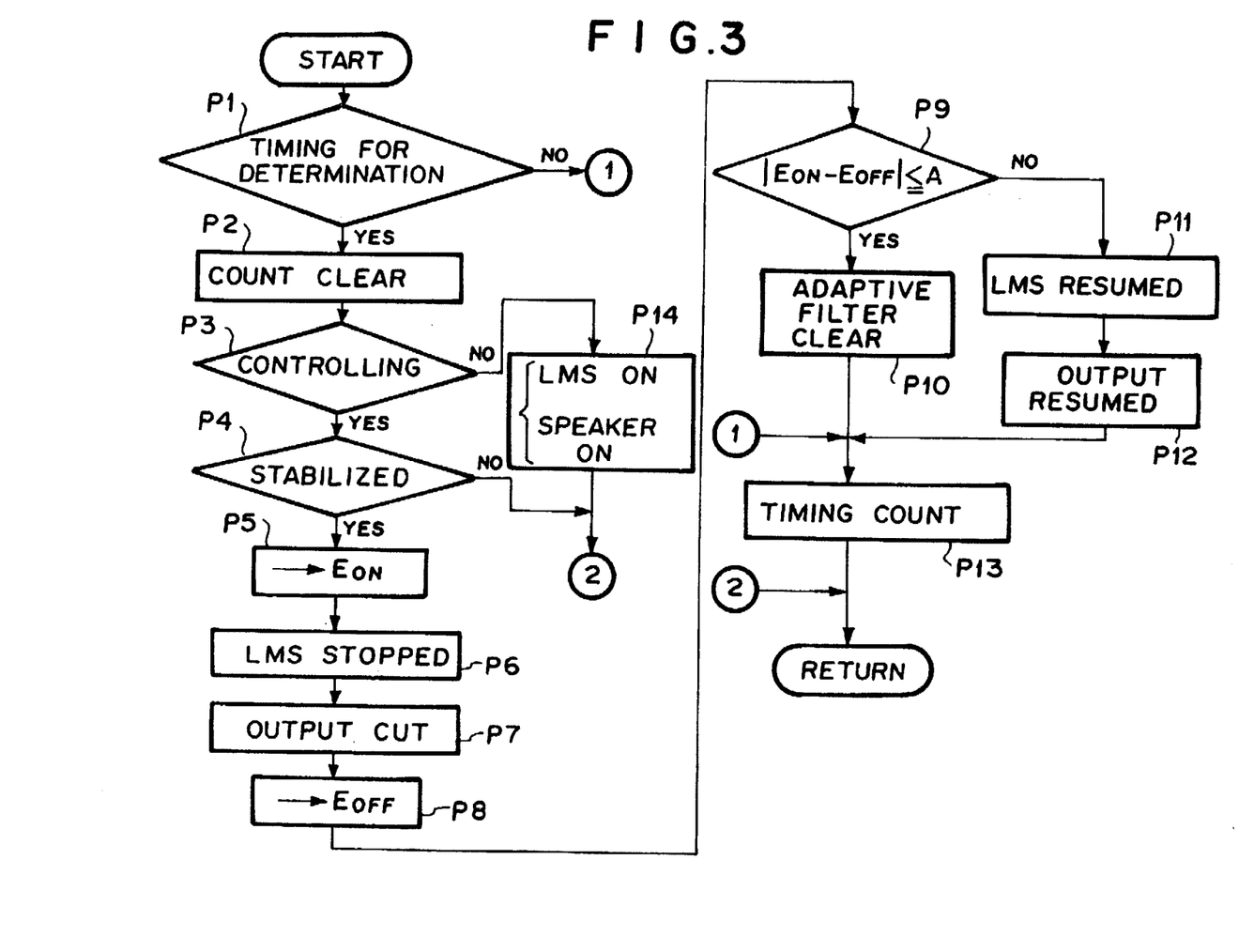
FIG. 3 is a flow chart for illustrating the operation of the control effect determining means employed in the first embodiment.

Operation of the control effect determining means 15 will be described with reference to the flow chart shown in FIG. 3.

It is first determined whether it is the timing for determination of the effect of control which is to be performed at regular intervals which are relatively long. (step P1) When it is determined that it is not the timing for the determination, an effect determination count is incremented in step P13. Then steps P1 and P13 are repeated until it becomes the timing for the determination of the effect of control. When it becomes the timing for the determination of the effect of control, the effect determination count is cleared and it is determined in step P3 whether the speaker 4 is generating vibration for damping the vibration of the air in the cabin. When it is determined that the speaker 4 is not generating the vibration, the vibration damping control is caused to start in step P14. That is, the adaptive algorithm 13 is caused to operate and drive of the speaker 4 is permitted. Then step P1 is executed again. Since the answer to the question in step P3 becomes YES once step P14 is executed, step p4 is executed after step 3 at this time. In step P4, it is determined whether the vibration damping control has been performed in a stabilized manner. In step P4, it is determined that the vibration damping control has been performed in a stabilized manner when the factor of the filter 11 is substantially fixed.

Steps P1 to P4 are repeated until it comes to be determined that the vibration damping control has been performed in a stabilized manner, and when it is determined that the vibration damping control has been performed in a stabilized manner, a detecting signal $E_{ON}$ from the microphone 5 is read in step P5. That is, the detecting signal $E_{ON}$ is the output of the microphone 5 when the speaker 4 is driven. Thereafter, the adaptive algorithm 12 is stopped (the factor of the filter 11 is fixed) in step P6 and output to the speaker 4 is cut in step P7. Then a detecting signal $E_{OFF}$ from the microphone 5 in this state is read in step P8. That is, the detecting signal $E_{OFF}$ is the output of the microphone 5 then the speaker 4 is not driven.

Then it is determined in step P9 whether the absolute value of the difference between the detecting signals $E_{ON}$ and $E_{OFF}$ is not larger than a predetermined value A. That the former is not larger than the latter means that the level of vibration in the cabin does not change greatly even if the vibration damping control is performed, that is, a satisfactory vibration damping effect cannot be expected even if the speaker 4 is driven. Accordingly, when it is determined that the former is not larger than the latter, the factor of the filter 11 is cleared in step P10 and then step P13 is executed. That is, the algorithm 12 is kept stopped and output to the speaker 4 is kept cut, i.e., the vibration damping control is inhibited.

On the other hand, when it is determined that the absolute value of the difference between the detecting signals $E_{ON}$ and $E_{OFF}$ is larger than the predetermined value A, which means that satisfactory vibration damping effect can be expected, the adaptive algorithm 12 is caused to resume operating and output to the speaker 4 is resumed. (step P11)

Figure 4:
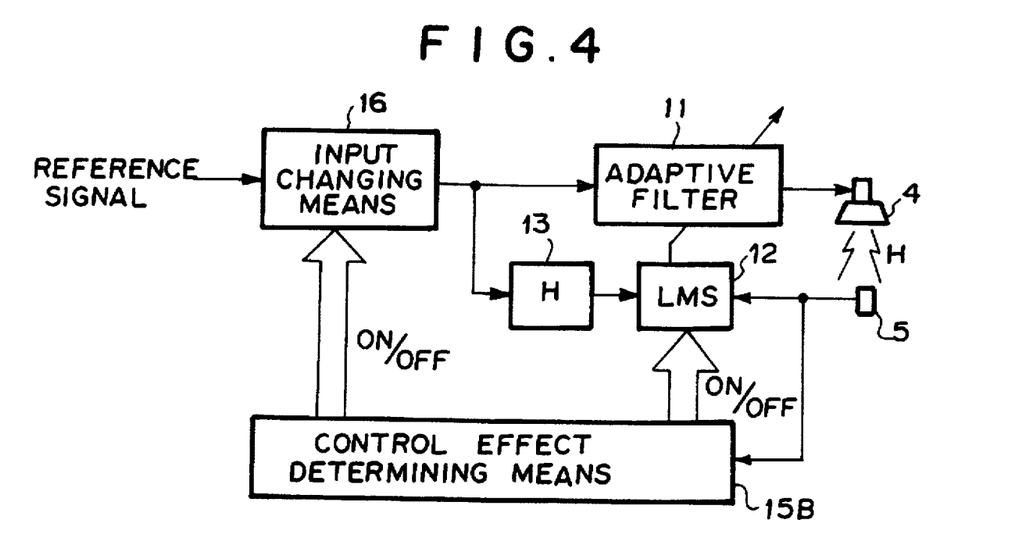
FIG. 4 is a schematic view showing the structure of the control box employed in a second embodiment of the present invention.

FIG. 4 shows the structure of the control box CB employed in a second embodiment of the present invention. In FIG. 4, the elements analogous to those shown in FIG. 2 are given the same reference numerals and will not be described here. In this embodiment, an input changing means 16 which permits or inhibits input of the reference signal to the transmission property model 13 and the filter 11 is provided in place of the output changing means 14 in the first embodiment. A control effect determining means 15B determines whether generation of vibration by the speaker 4 is effective for damping of the object vibration component transmitted to the air in the cabin from the engine 3 and switches the operational state of the adaptive algorithm 12 and the input changing means 16.

Figure 5:
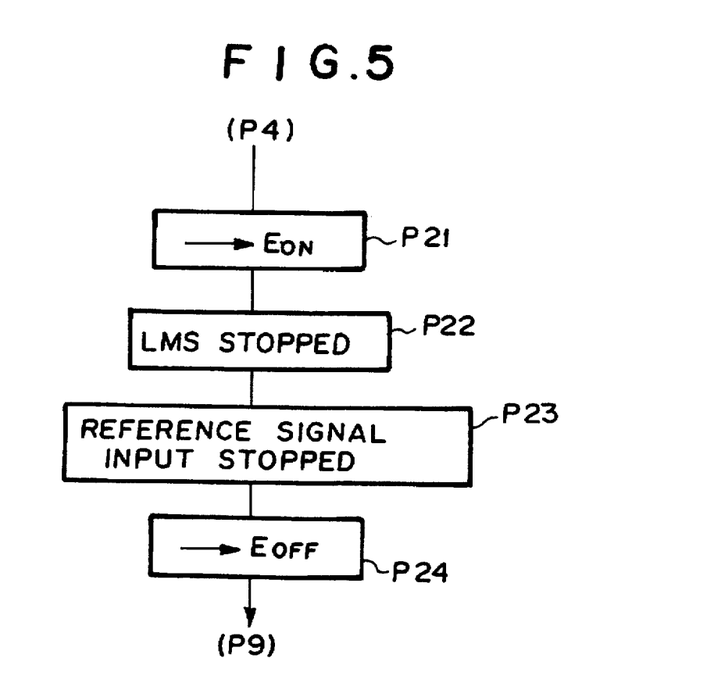
FIG. 5 is a flow chart for illustrating the operation of the control effect determining means employed in the second embodiment.

Operation of the control effect determining means 15B in this embodiment will be described with reference to the flow chart shown in FIG. 5. The flow chart shown in FIG. 5 substitutes fro steps P5 to P8 in the flow chart shown in FIG. 3. A detecting signal $E_{ON}$ from the microphone 5 when the speaker 4 is driven is read in step P21 and the adaptive algorithm 12 is stopped in step P22. Thereafter input of the reference signal to the filter 11 and the transmission property model 13 is stopped, and then a detecting signal $E_{OFF}$ from the microphone 5 in this state is read in step P24. That is, though being interrupted by inhibiting output to the speaker 4 in the first embodiment, the vibration damping control is interrupted by inhibiting input of the reference signal in the second embodiment.

Figure 6:
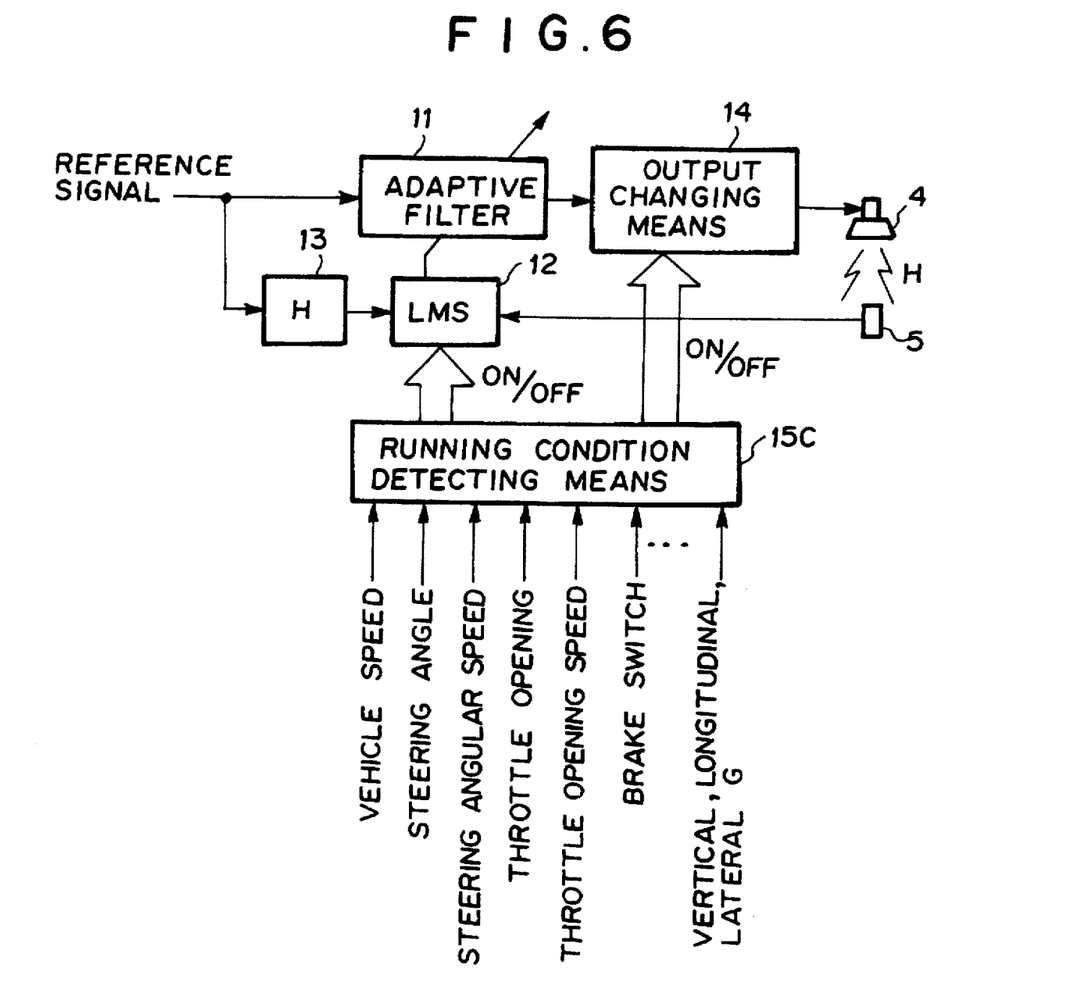
FIG. 6 is a schematic view showing the structure of the control box employed in a third embodiment of the present invention.

FIG. 6 shows the structure of the control box CB employed in a third embodiment of the present invention. The control box CB of this embodiment is substantially the same as that of the first embodiment except that a running condition detecting means 15C is provided in place of the control effect determining means 15 and the vibration damping control is inhibited when the running condition of the vehicle is in a transient state and is unstable. That is, in this embodiment, the output changing means 14 and the running condition detecting means 15C form the restraining means. Various signals for detecting the running condition of the vehicle are input into the running condition detecting means 15C as shown in FIG. 6.

Figure 7:
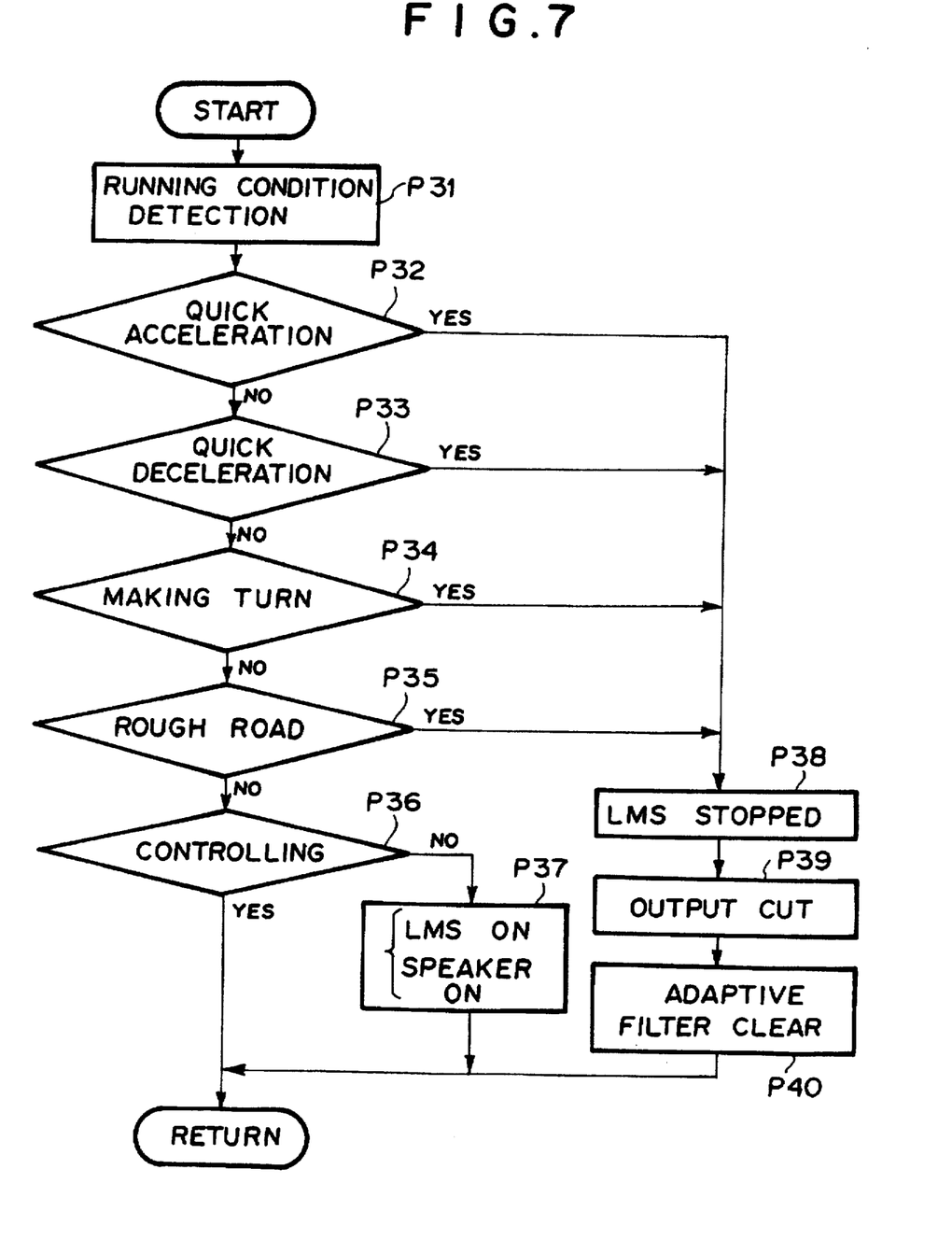
FIG. 7 is a flow chart for illustrating the operation of the running condition detecting means employed in the third embodiment.

As shown in the flow chart shown in FIG. 7, when the vehicle is quickly accelerating, quickly decelerating, making a turn, or temporarily running rough road (steps P31 to P35), it is determined that the outside vibration component is increasing above a predetermined level and the vibration damping control is inhibited (steps P38 to P40).

When neither of the aforesaid conditions is detected, it is determined in step P36 whether the speaker 4 is generating vibration for damping the vibration of the air in the cabin. When it is determined that the speaker 4 is not generating vibration, the vibration damping control started. (step P37)

Figure 8:
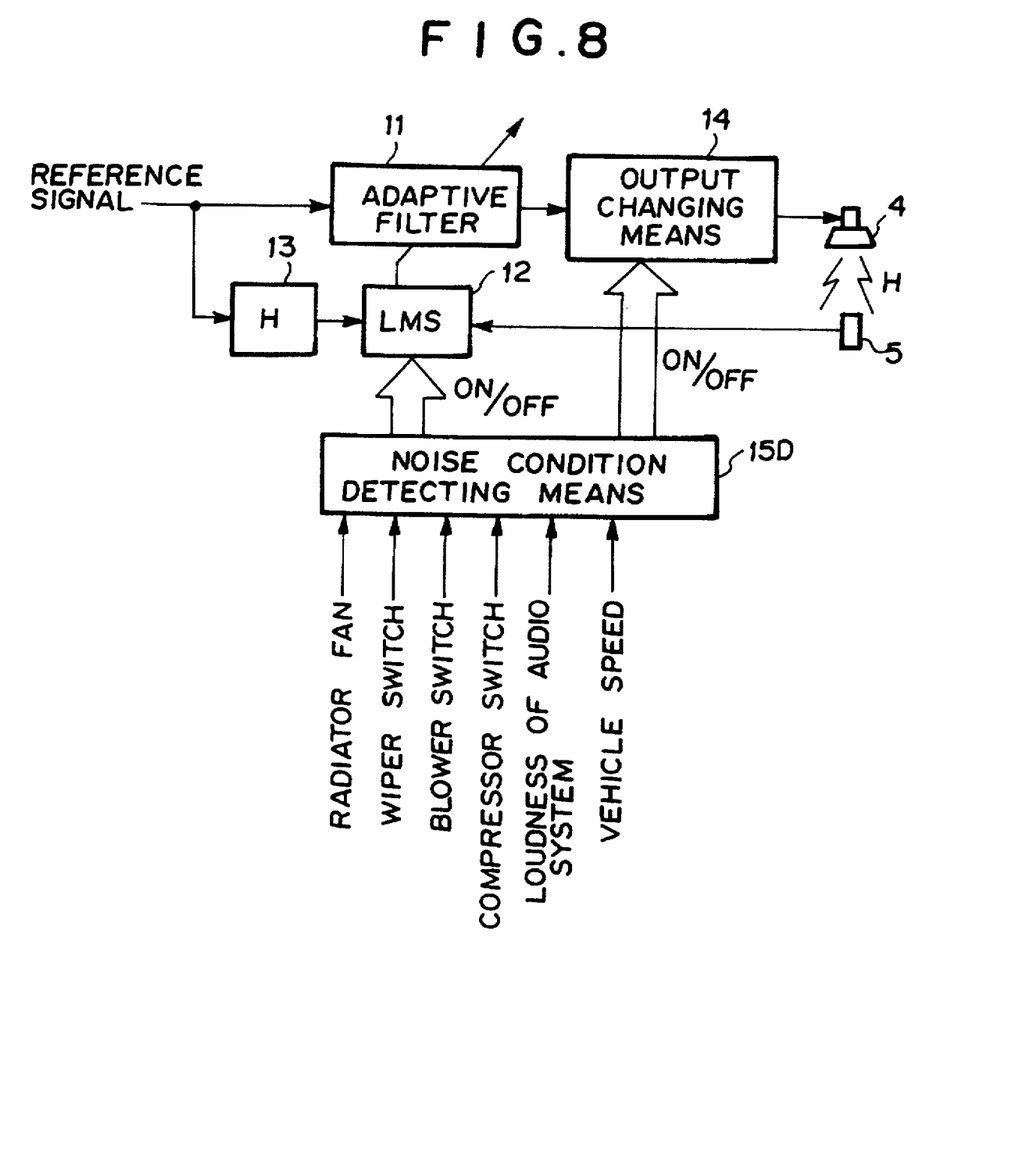
FIG. 8 is a schematic view showing the structure of the control box employed in a fourth embodiment of the present invention.

FIG. 8 shows the structure of the control box CB employed in a fourth embodiment of the present invention. The control box CB of this embodiment is substantially the same as that of the first embodiment except that a noise condition detecting means 15D is provided in place of the control effect determining means 15 and the vibration damping control is inhibited or permitted according to the state of instruments on the vehicle, other than the engine, operation of which generates vibration transmitted to the air in the cabin. That is, in this embodiment, the output changing means 14 and the noise condition detecting means 15D form the restraining means. Various signals for detecting the noise condition of the vehicle are input into the noise condition detecting means 15D as shown in FIG. 8.

Figure 9:
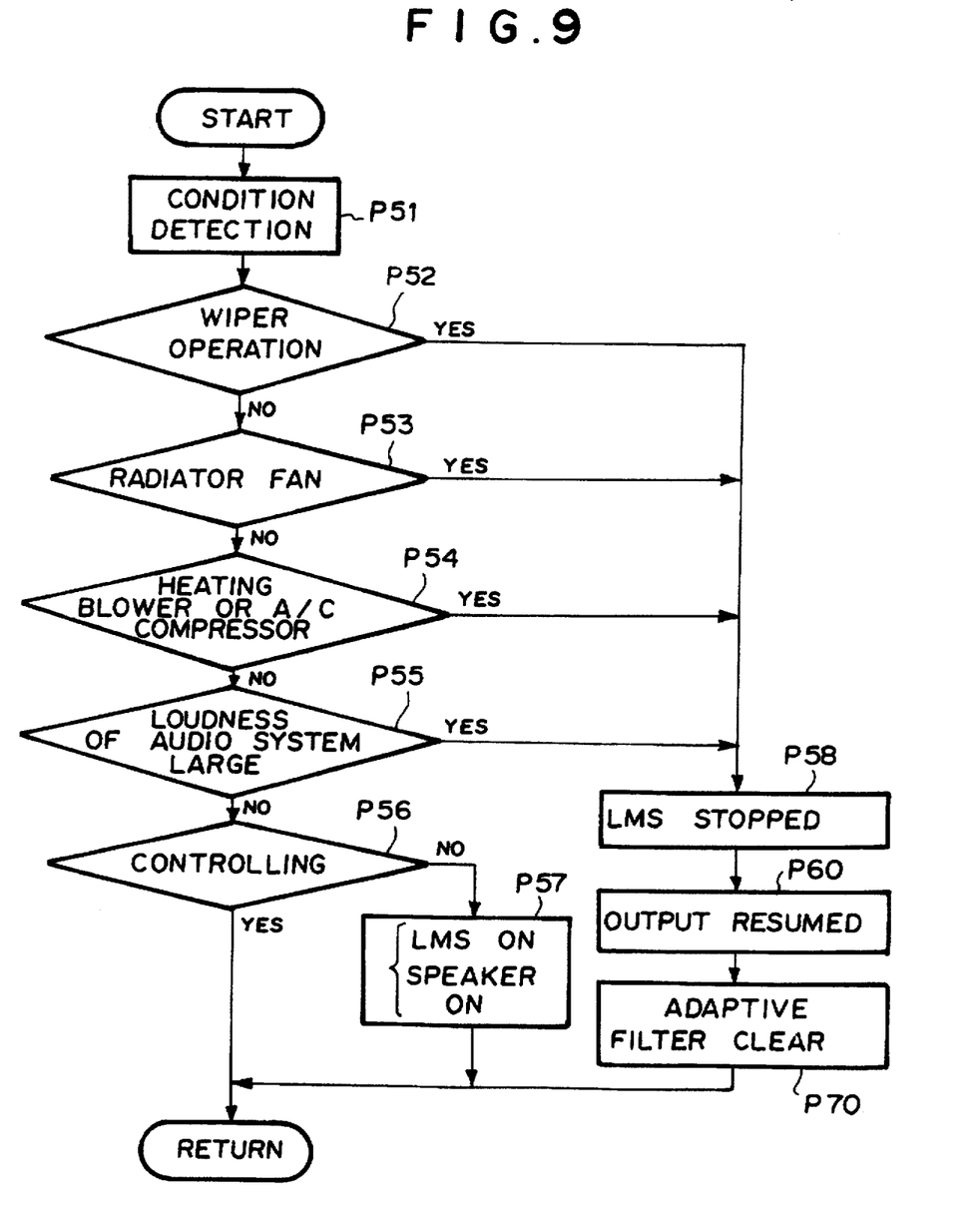
FIG. 9 is a flow chart for illustrating the operation of the noise condition detecting means employed in the fourth embodiment.

Operation of the noise condition detecting means 15D is shown in FIG. 9. That is, in the following cases, it is determined that the vibration component transmitted to the air in the cabin from instruments other than the engine (the outside vibration component) is increasing above a predetermined level and the vibration damping control is inhibited.

(1) When the wiper is operating. In this case, the vibration damping control may be inhibited whenever the wiper is operating or may be inhibited only when the wiper is operating at high speed without inhibiting when the wiper is intermittently operating or at low speed.

(2) When the radiator fan is operating.

(3) When the blower of the heater or the compressor of the air conditioner is operating. In this case, the vibration damping control may be inhibited only when the blower is operating at high speed or when the compressor is operating at high speed.

(4) When the loudness of the audio system is higher than a predetermined level.

Now a vibration damping system in accordance with a fifth embodiment of the present invention will be described with reference to FIGS. 10 to 12.

Figure 10:
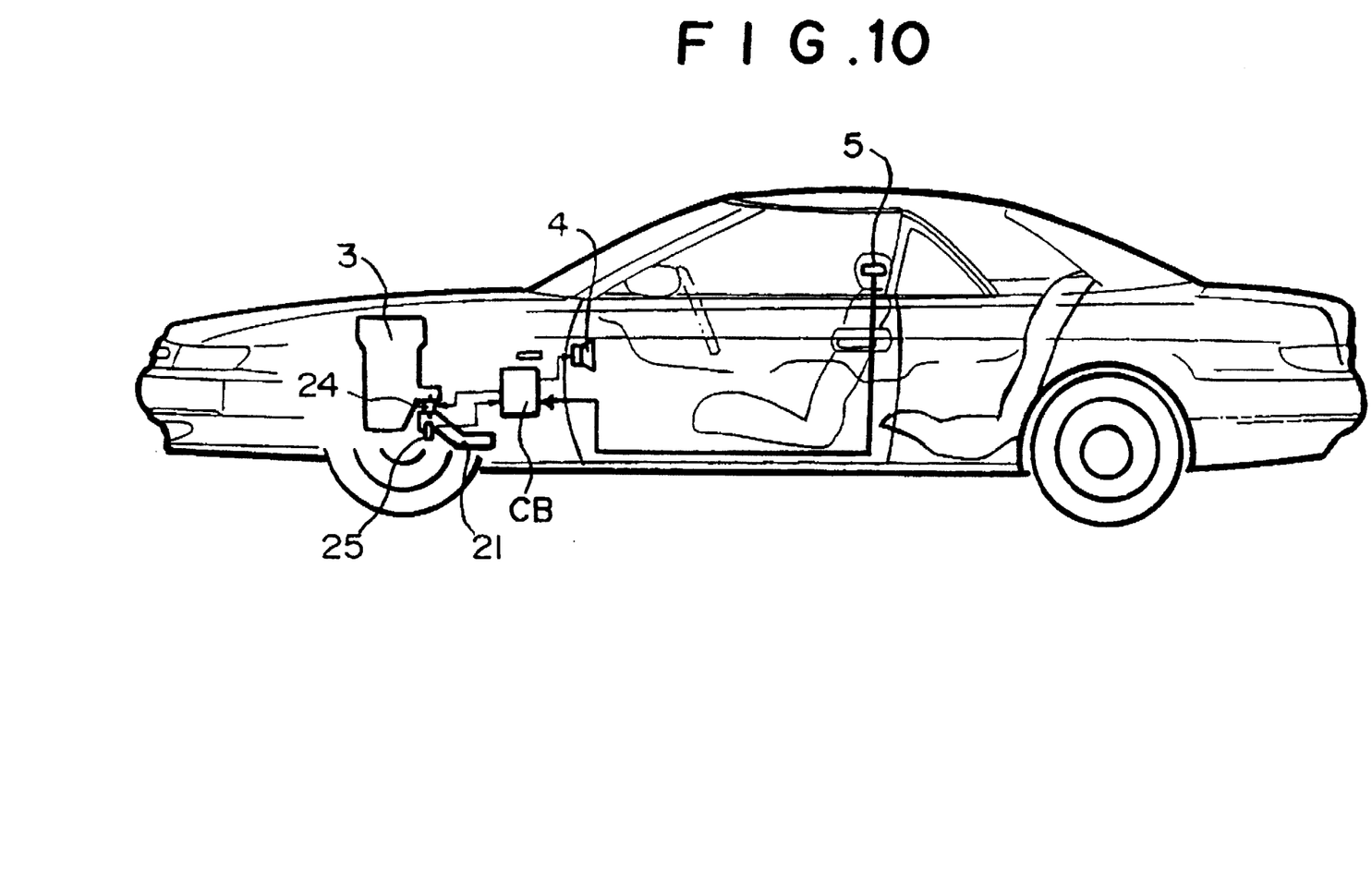
FIG. 10 is a schematic view of another vehicle provided with a vibration damping system in accordance the present invention.

As shown in FIG. 10, the vibration damping system of this embodiment comprises a microphone 5 which is disposed near a seat in the cabin (preferably near the ear of the passenger seated on the seat) and detects vibration of the air in the cabin, a speaker 4 which is disposed on the instrument panel and directly vibrates the air in the cabin, an acceleration sensor 25 which is disposed near the mounting portion of the engine 3 (as the power unit) to the body frame 21, a vibrating engine mount 24 which supports the engine 3 relative to the body frame 21 and directly vibrates the engine 3 and the body frame 21, and a control box CB which drives the speaker 4 and the vibrating engine mount 24. Though the speaker 4, the microphone 5, the vibrating engine mount 24 and the acceleration sensor 25 are each one in this embodiment for the purpose of simplicity, a plurality of speakers 4, the microphones 5, the vibrating engine mount 24 and the acceleration sensors 25 may be provided. The vibrating engine mount 24 is arranged to be driven to vibrate the engine 3 and the body frame 21 therebetween and to function as a normal engine mount when it is not driven. Further the resiliency of the vibrating engine mount 24 can be changed between a hard state and a soft state.

Figure 11:
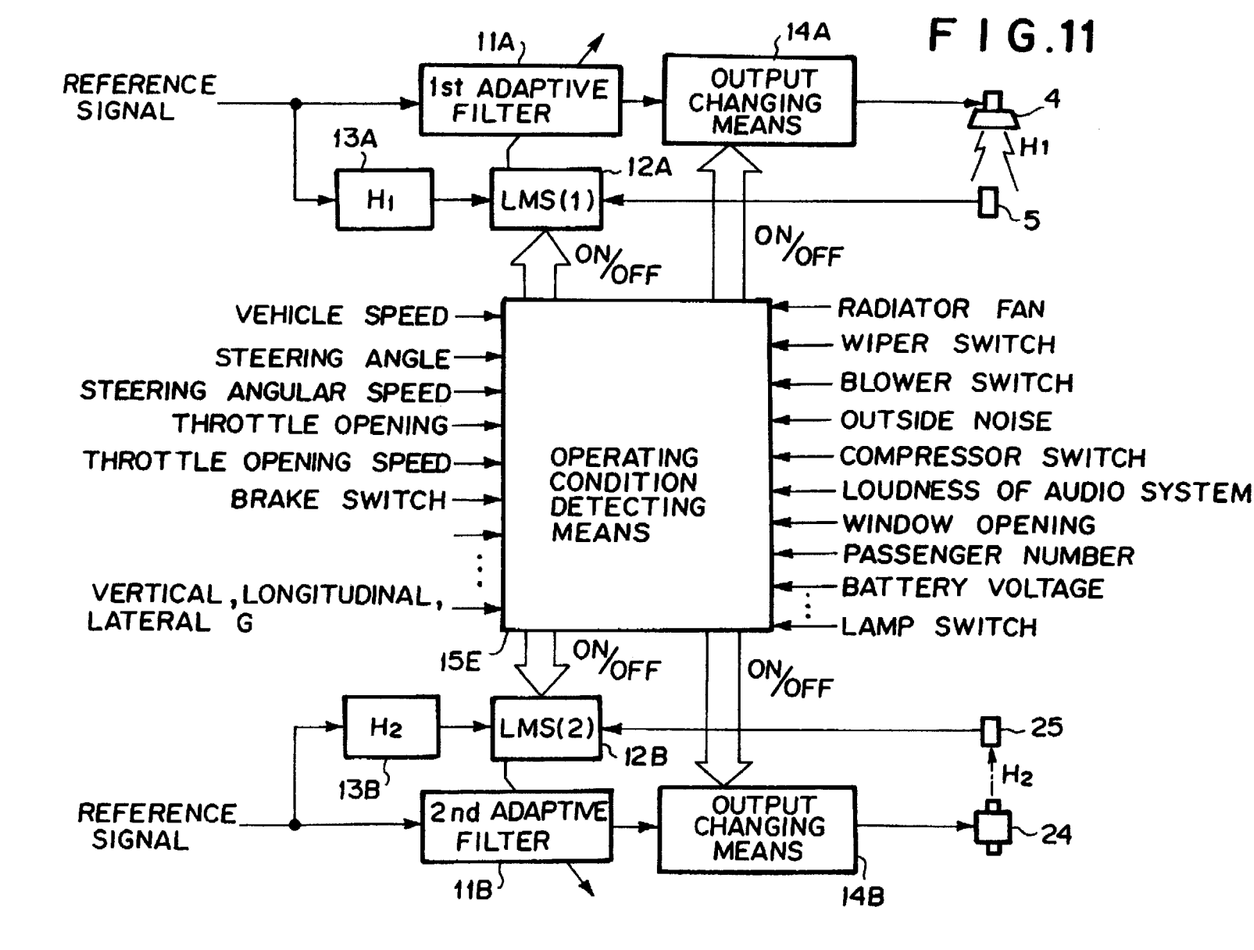
FIG. 11 is a schematic view showing the structure of the control box employed in a fifth embodiment of the present invention.

As shown in FIG. 11, the control box CB comprises first and second control systems. The first control system is formed by a first adaptive filter 11A, a first algorithm 12A which optimizes the factor of the filter 11A, and a first transmission property model (delay circuit) 13A modeled on the transmission properties between between the speaker 4 and the microphone 5 and adjusts every moment the level and the phase of the output signal to the speaker 4 so that the vibration of air in the cabin detected by the microphone 5 is damped. The second control system is formed by a second adaptive filter 11B, a second algorithm 12B which optimizes the factor of the filter 11B, and a second transmission property model 13B modeled on the transmission properties between between the vibrating engine mount 24 and the acceleration sensor 25 and adjusts every moment the level and the phase of the output signal to the vibrating engine mount 24 so that the vibration of the body frame 21 detected by the acceleration sensor 25 is damped.

As the first and second adaptive algorithms 12A and 12B, any one of various known algorithms such as of Least Mean Square Method can be employed. In this particular embodiment, the engine 3 is a four-cylinder four-cycle engine, and the vibration component transmitted from the engine 3 to the air in the cabin and the body frame 21, more particularly the engine revolution secondary component which is the most troublesome, is taken as the object vibration component.

In FIG. 11, reference numerals 14A and 14B respectively denote first and second output changing means which permits or inhibits transmission of the control signal from the first filter 11A to the speaker 4 and from the second filter 11b to the vibrating engine mount 24. Reference numeral 15E denotes an operating condition detecting means which detects the operating condition of the vehicle and switches the operational state of the adaptive algorithms 12A and 12B and the output changing means 14A and 14B. Thus in this embodiment, the output changing means 14A and 14B and the operating condition detecting means 15E form the restraining means.

Figures 12, 12A:
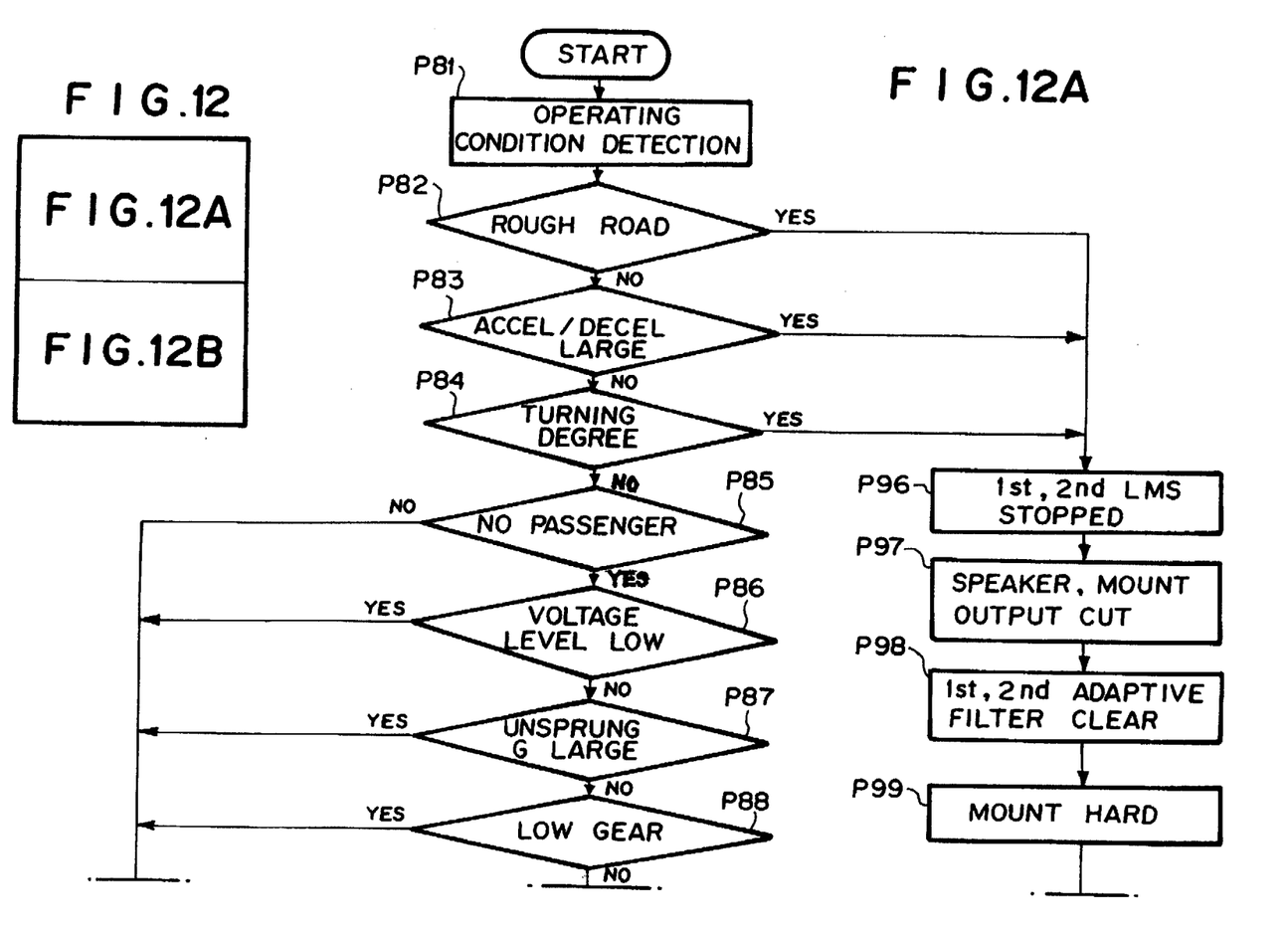
FIGS. 12A and 12B are flow charts for illustrating the operation of the operating condition detecting means employed in the fifth embodiment.
Figure 12B:
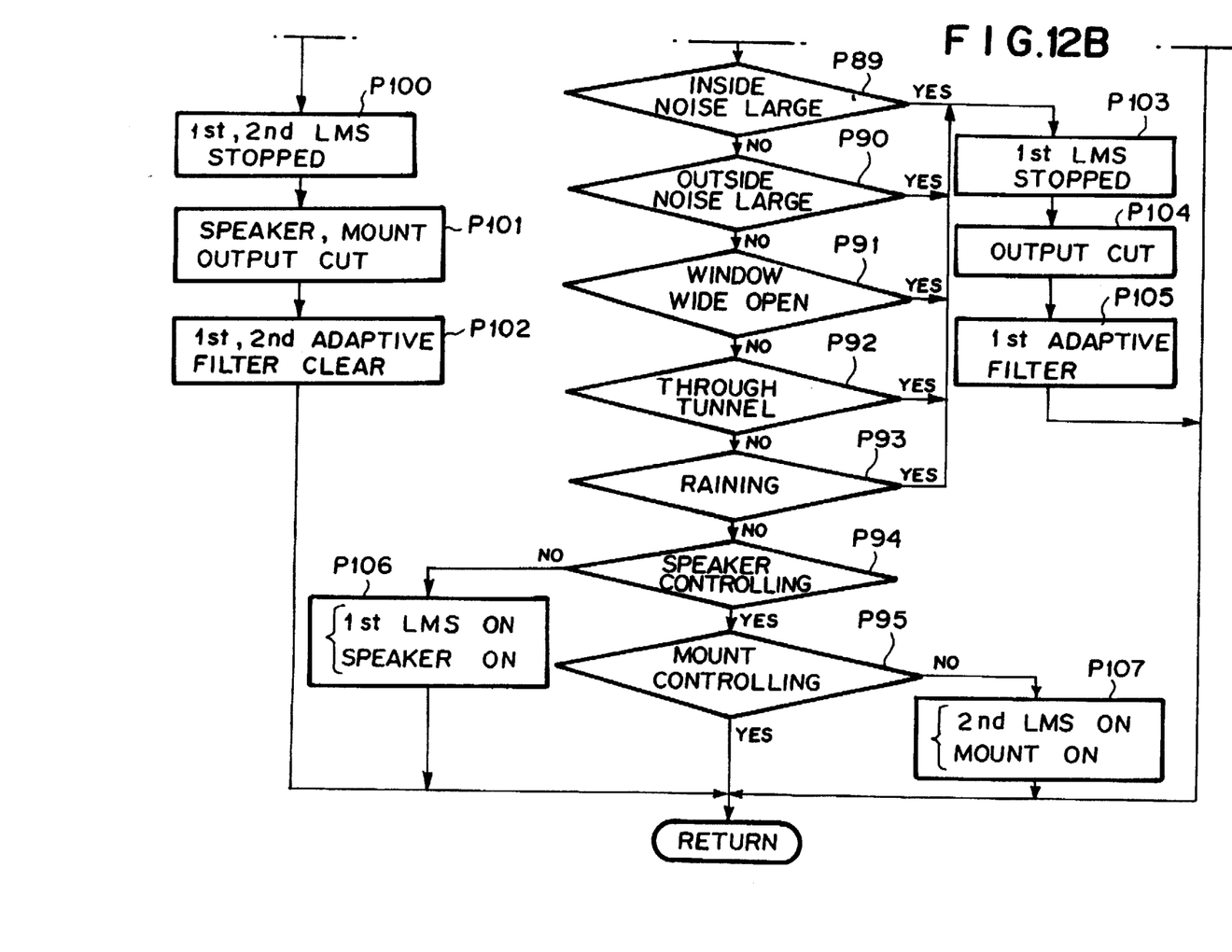

As shown in the flow chart shown in FIG. 12, when the vehicle is running rough road, the degree of acceleration or deceleration of the vehicle is higher than a predetermined value, or the degree of cornering of the vehicle is higher than a predetermined value (steps P82 to P84), it is determined that the outside vibration components transmitted to the air in the cabin and the body frame 21 from elements other than the engine 3 are increasing to such a level that a satisfactory vibration damping effect cannot be expected even if the speaker 4 or the vibrating engine mount 24 is driven and drive of both the speaker 4 and vibrating engine mount 24 is inhibited (steps P96 to P98).

In this case, the vibrating engine mount 24 is set hard to improve the driving performance of the vehicle. (step P99) That is, when the vehicle is running rough road or when the vehicle is making a quick acceleration or deceleration or a sharp turn, it is preferred that the vibrating engine mount 24 be set hard in view of the driving performance. Though, in this embodiment, the vibrating engine mount 24 is set hard after the vibration damping control is inhibited, the vibrating engine mount 24 may be arranged so that it is automatically set hard in response to inhibition of the vibration damping control.

Further when there is no passenger in the cabin (step P85), the battery voltage is lower than a predetermined value (step P86), the acceleration of the unsprung portion is larger than a predetermined value (step P87) or the transmission is in a low speed (step P88), drive of both the speaker 4 and vibrating engine mount 24 is inhibited (steps P100 to P102). When the acceleration of the unsprung portion is large, high frequency vibration is transmitted to the vehicle body from the road surface, and when the transmission is in a low speed, the acceleration or deceleration is apt to change. In both the cases, the outside vibration component transmitted to the air in the cabin and the body frame 21 is increasing and a satisfactory vibration damping effect cannot be expected even if the speaker 4 or the vibrating engine mount 24 is driven.

Further when the noise in the cabin is higher than a predetermined level (step P89), the noise outside the cabin is higher than a predetermined level (step P90), the window is opened wider than a predetermined value (step P91), the vehicle is running through a tunnel (step P92) or it is raining, it is determined that the outside vibration component transmitted to the air in the cabin is increasing to a predetermined level and drive of the speaker 4 is inhibited. (steps P103 to P105) Whether it is raining may be determined by use of a rain sensor though it may be determined through whether the wiper is operating.

The control of damping the vibration transmitted from the engine may be performed according to various methods other than the optimization method described above. For example, damping vibration which can damp the engine revolution secondary component during idling is experimentally generated and memorized for one cycle and the vibration may be damped by generation of the stored vibration only during idling. In this case, by adjusting the phase width of the stored damping vibration according to the engine speed, vibration damping effect can be obtained over a wide engine speed range.

What is claimed is:

1. A vibration damping system for a vehicle comprising a vibrating source, a vibration sensor which detects a vibration transmitted from said vibrating source to a predetermined vibrating element of the vehicle, a vibrator which vibrates the vibrating element, a drive control means for controlling the vibrator, said drive control means including receiving means for receiving a reference signal based on the vibration of the vibrating source and processing means for processing the reference signal by way of a signal from the vibration sensor and generating an output signal to the vibrator, said output signal being different than said reference signal, and a restraining means for suspending control of the vibrator during a time when the level of the vibration of another vibrating element is higher than a predetermined level.

2. A vibration damping system as defined in claim 1 wherein said restraining means suspends the drive control means form controlling the vibrating mount when the degree of acceleration or deceleration of the vehicle is larger than a predetermined value.

3. A vibration damping system as defined in claim 1 in which said restraining means is provided with an interrupting means which causes the drive control means to interrupt control of the vibrator and a comparing means which compares the level of the vibration of the vibrating element before the interruption with that during the interruption and determines whether the difference therebetween is larger than a predetermined value, and the restraining means determines that the level of the outside vibration component is higher than the predetermined level and suspends the drive control means when the difference between the level of the vibration of the vibrating element before the interruption and the level of the vibration of the vibrating element during the interruption is larger than the predetermined value.

4. A vibration damping system as defined in claim 1 in which said vibrating element is air in the cabin of the vehicle and said object vibration component is the vibration component due to vibration of a power unit of the vehicle.

5. A vibration damping system as defined in claim 4 in which said restraining means determines that the level of the outside vibration component is higher than the predetermined level and suspends the drive control means when the level of the vibration of air in the cabin while the vibrator is controlling is higher than a predetermined level.

6. A vibration damping system as defined in claim 4 in which said restraining means determines that the level of the outside vibration component is higher than the predetermined level and suspends the drive control means when the level of the vibration of air outside the cabin while the vibrator is controlling is higher than a predetermined level.

7. A vibration damping system as defined in claim 4 in which said restraining means determines that the level of the outside vibration component is higher than the predetermined level and suspends the drive control means when the window of the vehicle is opened wider than a predetermined value while the vibrator is controlling.

8. A vibration damping system as defined in claim 4 in which said restraining means determines that the level of the outside vibration component is higher than the predetermined level and suspends the drive control means when it is raining while the vibrator is controlling.

9. A vibration damping system as defined in claim 4 in which said restraining means determines that the level of the outside vibration component is higher than the predetermined level and suspends the drive control means when the vehicle is running through a tunnel while the vibrator is controlling.

10. A vibration damping system as defined in claim 4 in which said restraining means determines that the level of the outside vibration component is higher than the predetermined level and suspends the drive control means when a predetermined instrument other than the power unit is operating at a level higher than a predetermined level while the vibrator is controlling.

11. A vibration damping system as defined in claim 10 in which said predetermined instrument is an audio system.

12. A vibration damping system as defined in claim 4 in which said restraining means determines that the level of the outside vibration component is higher than the predetermined level and suspends the drive control means when the vehicle is in one of a quickly accelerating condition, a quickly decelerating condition and a cornering condition while the vibrator is controlling.

13. A vibration damping system as defined in claim 4 in which said restraining means determines that the level of the outside vibration component is higher than the predetermined level and suspends the drive control means when the transmission is in a low gear speed while the vibrator is controlling.

14. A vibration damping system as defined in claim 4 in which said restraining means determines that the level of the outside vibration component is higher than the predetermined level and suspends the drive control means when the vehicle is running rough road while the vibrator is controlling.

15. A vibration damping system as defined in claim 1 in which said vibrating element is a body forming element of the vehicle and said object vibration component is the vibration component due to vibration of a power unit of the vehicle.

16. A vibration damping system as defined in claim 15 in which said restraining means determines that the level of the outside vibration component is higher than the predetermined level and suspends the drive control means when the vehicle is in one of a quickly accelerating condition, a quickly decelerating condition and a sharply cornering condition while the vibrator is controlling.

17. A vibration damping system as defined in claim 15 in which said restraining means determines that the level of the outside vibration component is higher than the predetermined level and suspends the drive control means when the transmission is in a low gear speed while the vibrator is controlling.

18. A vibration damping system as defined in claim 15 in which said restraining means determines that the level of the outside vibration component is higher than the predetermined level and suspends the drive control means when the vehicle is running rough road while the vibrator is controlling.

19. A vibration damping system as defined in claim 1 wherein said restraining means suspends the drive control means from controlling the vibrating mount when the degree of cornering of the vehicle is larger than a predetermined value.

20. A vibration damping system as defined in claim 1 wherein said restraining means suspends the drive control means from controlling the vibrating mount when the vehicle is running on a rough road.

* * * * *